(12) United States Patent
Blatter et al.

(10) Patent No.: US 8,200,071 B1
(45) Date of Patent: Jun. 12, 2012

(54) DIGITAL RECORDER WITH TRICK PLAY OPERATION

(75) Inventors: Harold Blatter, Indianapolis, IN (US); Karl Francis Horlander, Indianapolis, IN (US); Michael Joseph McLane, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/269,684

(22) PCT Filed: Oct. 8, 1997

(86) PCT No.: PCT/US97/18167
§ 371 (c)(1),
(2), (4) Date: Mar. 30, 1999

(87) PCT Pub. No.: WO98/16069
PCT Pub. Date: Apr. 16, 1998

(51) Int. Cl.
*H04N 5/783* (2006.01)
(52) U.S. Cl. .......................... 386/343; 386/348
(58) Field of Classification Search .............. 386/68, 386/6, 1, 27, 33, 109, 111, 112, 23, 46, 67, 386/69, 72, 74, 343, 348, 345, 347, 330, 386/329, 332, 334
See application file for complete search history.

(56) References Cited

U.S. PATENT DOCUMENTS 5,377,051 A * 12/1994 Lane et al.
5,450,209 A    9/1995 Niimura et al.

FOREIGN PATENT DOCUMENTS

| EP | 0505985 | 9/1992 |
| EP | 0693858 | 1/1996 |
| GB | 2288510 | * 10/1995 |
| JP | 62-223876 | 10/1987 |
| JP | 57-34633 | 7/1992 |
| JP | 05-268563 | 10/1993 |
| JP | 05-307867 | 11/1993 |
| JP | 07-162800 | 6/1995 |

OTHER PUBLICATIONS

Sang-Lak Lee et al. "Skip Play Technology for Home-Use Digital VCRs" IEEE Transactions on Consumer Electronics, vol. 41, No. 3, Aug. 1995, pp. 662-667.
Kazuharu, N., Patent Abstracts of Japan, JP 05-268563, published Oct. 15, 1993, Toshiba Corp.

(Continued)

*Primary Examiner* — Robert Chevalier
(74) *Attorney, Agent, or Firm* — Robert D. Shedd; Robert B. Levy; Jorge Tony Villabon (57) ABSTRACT

A record and replay apparatus comprises a transducing unit for reproducing a digital signal from a medium. A control unit controls a reproduction mode of the apparatus. A decoding is coupled to the transducing unit for decoding the digital signal and deriving therefrom a signal indicative of a specific picture type. The reproduction mode has a first period of reproduction at a normal play speed and a second period of reproduction at a speed greater than the play speed. The first and second periods alternating with the first period initiated responsive to the signal indicative of a specific picture type. In a further arrangement a first transducing unit records an MPEG signal. A control unit generates a signal, indicating an intra coded frame occurrence in the MPEG bit stream, which is recorded by a second transducing unit together with a servo reference signal.

4 Claims, 5 Drawing Sheets

OTHER PUBLICATIONS

Yutaka, O., Patent Abstracts of Japan, JP 05-307867, published Nov. 19, 1993, Matsushita Electric Ind. Co. Ltd.

Nobuyoshi, T., et al, Patent Abstracts of Japan, JP 07-162800, published Jun. 23, 1995, Hitachi Ltd.

Takeshi. W., et al., Patent Abstracts of Japan, JP 57-034633, published Feb. 25, 1982, Nippon Electric Co.

Takeshi, O., et al., Patent Abstracts of Japan, JP 62-223876, published Oct. 1, 1987, Victor Co. of Japan Ltd.

* cited by examiner

FIG. 1

FIG. 3A
STANDARD CONTROL TRACK PULSES

FIG. 3B
CODED CONTROL TRACK PULSES

FIG. 3C
CONTROL TRACK DATA PULSES

DIGITAL RECORDER WITH TRICK PLAY OPERATION

This invention relates to the field of digital video recording and in particular to reproduction at speeds other normal.

BACKGROUND OF THE INVENTION

A digital video signal may be processed to form a bit stream having a reduced bit rate. Such processing for bit rate reduction may be implemented according to an MPEG compression method, and may be formatted for example, with a structure, such as that employed in a digital satellite system, for example DSS™ or the proposed Grand Alliance or GA terrestrial system.

A consumer video recorder may be adapted to provide recording capabilities for both analog signals and digitally encoded signals processed for example, for compatibility with an MPEG standard and having for example GA or DSS™ signal formats. The adapted consumer video recorder may be considered as two electronic systems within one box, sharing a recording mechanism, servo and control systems. A conventional analog recording method may be employed where an analog luminance signal component frequency modulates an RF carrier and an analog chrominance signal component amplitude modulates a second RF carrier. When reproduced, the two modulated signals are demodulated, combined and coupled for video display.

Digital recording may be achieved by employing the consumer video recorder as a digital bit stream recorder/player. The MPEG compatible bit stream, for example transport packets, may be recorded by reformatting and processing to facilitate recording and reproduction. In a playback mode the recording processes are effectively reversed, and the bit stream is restored to have the original MPEG format and time relationships.

The material cost of a consumer digital recorder may be minimized by the omission of MPEG processing or decoding. Thus, the recorder records and replays the MPEG packet stream without changes or additions. Hence the consumer digital recorder functions as a bit stream recorder for program delay or time shifting usage.

The MPEG compression method employs intra coded frames, or I frames, forward predicted frames, or P frames and a bidirectionally predicted frames, or B frames. These three types of frames occur in groups known as Groups Of Pictures or GOPs. The number of frames in a GOP is user definable but may comprise, for example, 12 or 15 frames. Each GOP contains one I frame, which for transmission is abutted by a P frame which is followed by a sequence of B and P frames. Only I frame data may be decoded independently of any other frame, P frames may be predicted from a preceding I or P frame. Bi-directionally predicted frames or B frames require prediction from surrounding I or P frames.

In an analog consumer VCR, trick play features, such as picture in forward or reverse shuttle, fast or slow motion, are readily achievable, since each recorded track typically contains one field with adjacent tracks containing similar, but temporally off set images. Reproduction at speeds other than the recorded speed result in the reproducing head, or heads, crossing multiple tracks, and recovering recognizable picture segments. However, when an MPEG signal is recorded, the I, P and B frames of each GOP occupy adjacent tracks. When replayed at play or normal speed, the I frame data must be recovered first in order to permit the reconstruction of succeeding P and B frames. When the MPEG recording is replayed at a speed different to normal speed the replay heads transduce sections or segments from multiple tracks. However, these replayed segments contain parts of a GOP which, unlike the analog recording condition, no longer represent sections of discrete records from consecutive images. Instead, the transduced segments contain data resulting mainly from predicted P and B frames of the GOP. Clearly, since during trick play operation the amount of I frame data replayed progressively diminishes as the trick play speed increases, there is little possibility of decoding P and B frames from the reproduced pieces of I frame data. In addition, if the replayed I frame data is to be decoded it must comply with the syntax required by the MPEG standard. Thus, in a consumer digital recorder which does not process the MPEG stream to redistribute I frame data or form trick play data for redundant recording, reproduction at other than normal play speed may be precluded.

SUMMARY OF THE INVENTION

A record and replay apparatus comprises a transducing means for reproducing a digital signal from a medium. A control means for controls a reproduction mode of the apparatus. A decoding means is coupled to the transducing means for decoding the digital signal and deriving therefrom a signal indicative of a specific picture type. The reproduction mode has a first period of reproduction at a normal play speed and a second period of reproduction at a speed greater than the play speed. The first and second periods alternating with the first period initiated responsive to the signal indicative of a specific picture type.

In a further inventive embodiment a record and replay apparatus is coupled at an input to a source of an MPEG bit stream signal for recording. A first transducing means records and reproduces a digital signal representative of the MPEG bit stream. A control means is coupled to the MPEG bit stream signal and generates a signal indicating an intra coded frame occurrence in the MPEG bit stream. A second transducing means records and reproduces a servo reference signal. A generating means is responsive to the indicating signal for generating a identifying signal for recording with said servo reference signal.

In yet a further inventive embodiment a recording and replay apparatus has a trick play reproduction mode comprising the steps of:
 a) initiating a play mode for I frame reproduction from a recorded media;
 b) initiating a fast play mode to pass the recorded media;
 c) resuming the play mode for reproduction of a subsequent I frame from the media; and,
 d) controlling transitions between the play and said fast play modes responsive to a fast play mode predetermined sequence.

In another inventive embodiment a recording and replay apparatus has a trick play reproduction mode comprising the steps of:
 a) initiating a play mode;
 b) determining an average number of control track pulses occurring between I frames;
 c) selecting a trick play mode;
 d) counting control track pulses to determine an average value;
 e) testing a count for equality with the average number; and,
 f) initiating said play mode at count equality.

DETAILED DESCRIPTION

Figure 1:
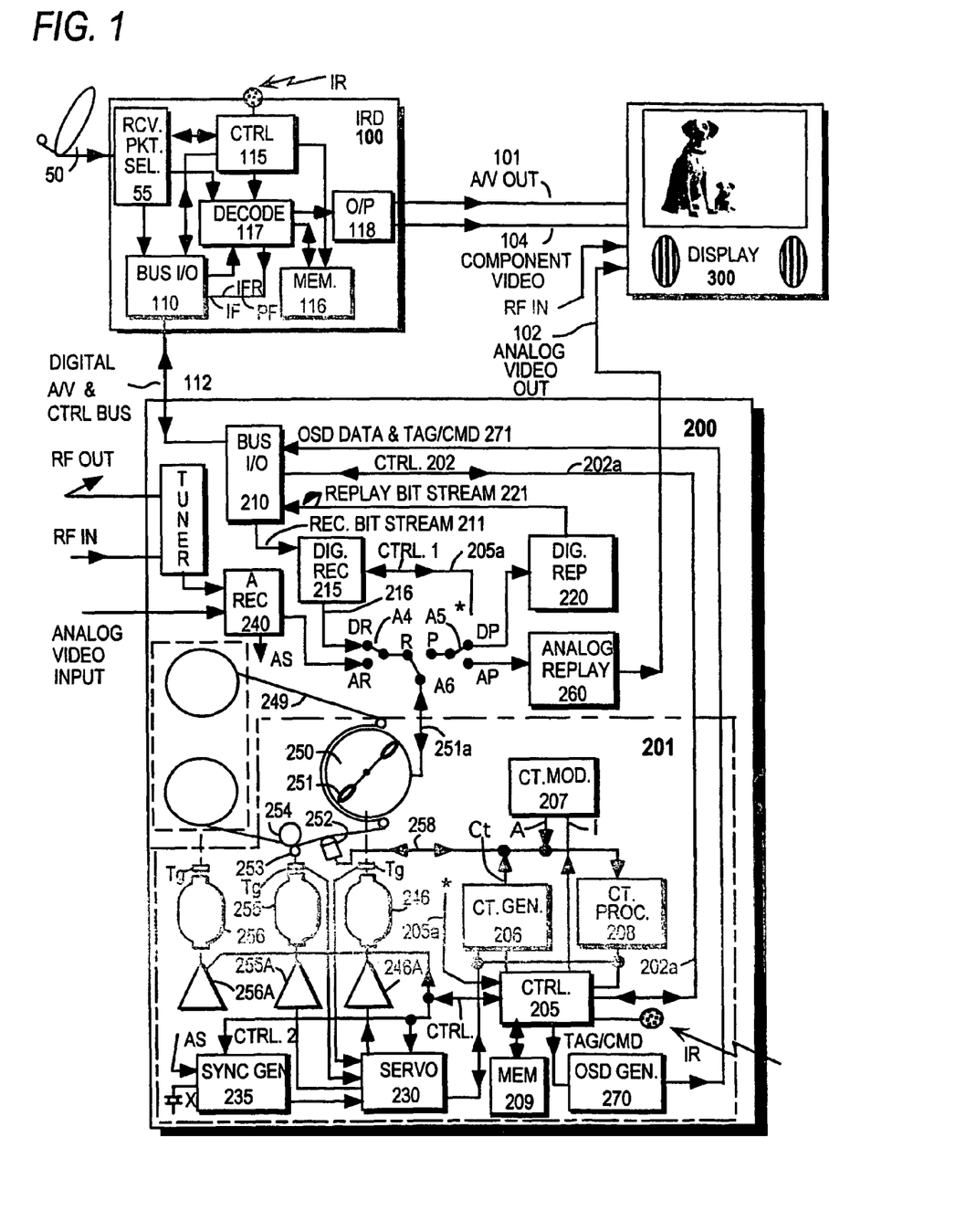
FIG. 1 depicts an exemplary block diagram including various inventive embodiments.

A simplified consumer digital audio video system is illustrated in FIG. 1. A receiver, IRD 100, is depicted coupled to a receiving antenna 50, however, an RF modulated signal may be provided from a cable distribution network (not shown). The modulated packetized signal is tuned, demodulated and a user determined program separated within the receiver packet selector block indicated as RCV. PKT. SEL. 55. An output from the receiver packet selector 55 comprises a transport packet stream of audio video and control data which is MPEG decoded by DECODER 117. The MPEG decoder operates in conjunction with a memory, MEM. 116, which stores several frames including the last I frame. In the event of an MPEG data stream loss or mangled MPEG syntax, decoder 117 and memory 116 are controlled by controller 115 to sustain output signal generation by repeating a preceding frame from memory 116. Thus data stream loss or distortion, for example, due to rain fade, replay data loss, drop out or distortion, causes the last frame to be duplicated, producing a frozen or still frame image, for the duration of the data outage. The decoder generates audio and video signals which are coupled to output block O/P 118 which produces analog audio and video output signals, 101 and 104, which are coupled for monitoring by display 300.

Replay packet source 200, which may for example, conform to the D-VHS or DVC recording formats, is illustrated in the simplified exemplary block diagram of FIG. 1. As described previously, cost considerations may dictate that digital recorder 200 does not include MPEG encoding and decoding. Hence digital recorder 200 functions as a bit stream recorder/player, and provides time shifting or program delay capability. The omission of MPEG decoding and the degree of complexity required to facilitate non-standard speed replay capability, renders image reproduction difficult at speeds other than play speed. In summary, receiver IRD 100 couples an MPEG compatible packet stream via digital A/V bus 112 for recording by recorder 200. Similarly a replay packet stream is coupled via bus 112 to receiver IRD 100 for MPEG decoding, and audio/video generation.

Player recorder 200, illustrated in FIG. 1, receives demodulated transport packets from receiver IRD 100 via bi-directional data bus 112. The transport packet stream is formatted for bus transmission, for example as a superpacket with superpacket header, and coupled to data bus 112 via an interface port 110. The formatted transport packet is received at recorder 200 by means of interface port 210 which derives a record bit stream 211. The interface ports are controlled by a control data stream carried on a separate conductor included with data bus 112. Control signals may be derived from user input by activation of control switches (net shown), or by user generated remote control commands.

The record bit stream 211 is coupled for processing by recording block DIG. REC. 215. Digital recording block 215 includes a buffer memory which is utilized to smooth the intermittent delivery of transport packets to produce a signal more suited for recording. The buffered data stream is read from the buffer memory to form sync blocks which may be encoded with error detection/correction data words. The sync block formatted data stream may be modulated for recording as described, and coupled from recording block DIG. REC. 215 via a selector switch A4. Selector switches A4 and A5 are controlled responsive to the selected D-VCR operating mode. For example, switches A4 and A5 are shown positioned for digital operation, with digital recording signals routed by switch contacts DR, digital playback data routed by switch contacts DP. A record play switch A6 couples data stream 251a to and from transducer heads 251 located on rotating head assembly 250. Analog operation is facilitated by the alternate positions of switches A4 and A5, designated analog record AR, and analog playback AP. Sync block formatted data from recording block DIG. REC. 215 is coupled to rotating head assembly 250 for recording by heads 251 on a magnetic tape 249.

During replay operation, sync block formatted data is reproduced from the magnetic tape 249 by transducing heads 251 positioned on assembly 250. The recovered signal is demodulated by digital replay block DIG. REP. 220, to remove any recording channel modulation. The replay signal is then subject to error detection and correction by means of the data words inserted prior to recording. Following error correction, the sync block formatting is removed and the transport packet stream restored to have substantially the same the packet format and timing as that coupled to the recorder for recording. The transport packet stream from block DIG. REP. 220 is coupled to interface port 210 which, responsive to the recorder play mode couples the packet stream to the bi-directional data bus 112 for MPEG decoding by decoder 117.

Player recorder 200 includes a servo control system represented within dash line box 201. During analog operation synchronizing signals AS are separated from the analog signal to be recorded in analog record processor block 240, and are coupled to synchronize sync generator 285. Synchronization is required to ensure that servo block 280 controls rotation of the capstan motor 255 and rotary head motor 246 in synchronism with the analog video signal. In simple terms the capstan must pull the tape at a constant rate locked to the analog signal and the rotary head must write the analog signal at predetermined media locations. However, unlike analog signals, the MPEG packet stream cannot readily provide synchronizing signal AS required for servo system control of recorder 200. Hence during digital operation servo system 201 utilizes synchronizing signals generated by synchronizing generator 285 which is referenced to a crystal oscillator X. Thus sync generator 285 provides stable control signals which ensure that head assembly 250 is locked and synchronized at 30 revolutions per second and the tape is transported at substantially the same speed as during analog operation.

In addition to smoothing the intermittent delivery of transport packets, the buffer memory of recording block 215, enables the output signal 216 to be recorded at predetermined locations on tape 249. For example, buffer memory may be read out in synchronism with rotation of head assembly 250. Similarly each video data sync block, formatted from the buffer may be read out to have a specific location in each recorded track. Synchronization of the buffer memory of block 215 is provided by a control signal, CTRL. 1 generated by controller 205.

As is known in analog recording, the recording head assembly 246, 250 and capstan motor assembly 253, 555 are servo controlled to rotate in synchronism one with the other, and in synchronism with an analog sync signal. During digital recording, the head and capstan motors may be referenced to the crystal controlled synchronizing generator 285. To ensure replay synchronism between the capstan and video head drum a control track is recorded along a bottom tape edge as shown in exemplary FIG. 2A. Control track pulses are, for example, derived from the head drum and consequently have a repetition rate 30 Hz. Thus for each head drum revolution a control track pulse marks one track, for example having an azimuth angle Ø1. Since the head drum employs two heads spaced by 180 degrees, nominally 60 tracks are recorded per second. The recorded control track signal is illustrated in FIG. 2B and shows a control track pulse marking the start of alternate tracks. Twelve frame groups of pictures are illustrated in FIG. 2A, and for simplicity, longitudinal audio tracks and transverse track angles are not shown.

Reproduction at speeds other than normal play speed may be advantageously facilitated by use of a stored automated play control sequence which alternates recorder control modes between normal play speed and fast play speed operation. During fast play operation the capstan pinch roller 254 remains engaged with capstan 253 and the rotational speed is increased and maintained under servo control. For example in FIG. 2A, 12 frame groups of pictures are illustrated, repeating on average every 24 tracks with the first two tracks depicted with I frame data. If normal play speed operation is initiated from any location in the track patterns of FIG. 2A, I frame data must be recovered within 24 tracks or twelve control track (CT) pulses. Thus in the automated control sequence described above, normal play speed operation may be activated for a duration of 12 CT pulses and fast play, for example at four times speed, selected for approximately 256 control track pulses. Hence this exemplary automated trick play sequence will sample the recorded tracks approximately every 2 seconds, which corresponds to approximately 8.5 seconds of elapsed tape or program time at 30 Hz drum rates or about 10 seconds with 25 Hz speeds. Thus a forward search trick play mode is provided which comprises a series of still I frames images spaced by nominally 8-10 seconds of elapsed program time. During fast play periods the reproduced MPEG syntax may be mangled and the data stream lost, however, IRD decoder 117 and memory 116 advantageously sustain the output signal by repeating the last preceding frame from memory. A reverse search trick play mode may be similarly provided where capstan rotation is reversed for the period of the exemplary 256 control track pulses. However, such reverse tape motion requires controlled operation of the take up and supply tape reels to prevent slack, or over tensioning causing tape damage.

In a further advantageous embodiment controller 205 receives control data signal 202 from bus interface 210 via control line 202a. Control data signal 202 is generated within IRD 100 and includes a signal component IF which marks the occurrence of an I frame in the transport packet stream coupled for recording. Intra-frame marker signal IF may be communicated to recorder 200 by means of a header added to a superpacket employed for transport packet bus communication, or as a separate control signal coupled via bus 112. The superpacket header is read by digital recording block 215 and IF marker extracted an sent to controller 205 via control line 205a. In an alternative arrangement digital recording block 215 may filter bit stream 211 to determine an intra-frame occurrence by extracting picture header information from GOP and sequence headers. Controller 205 may employ the I frame marker signal IF together with head and capstan phase information to form control signal CTRL 1. Control signal CTRL 1 controls read out from the buffer memory of block 215 to ensure that I frame data recording is initiated in tracks of the same recorded azimuth. Thus the inventive use of I frame marker IF ensures that each I frame recording is initiated in tracks of the same recorded azimuth angle.

Figure 2A:
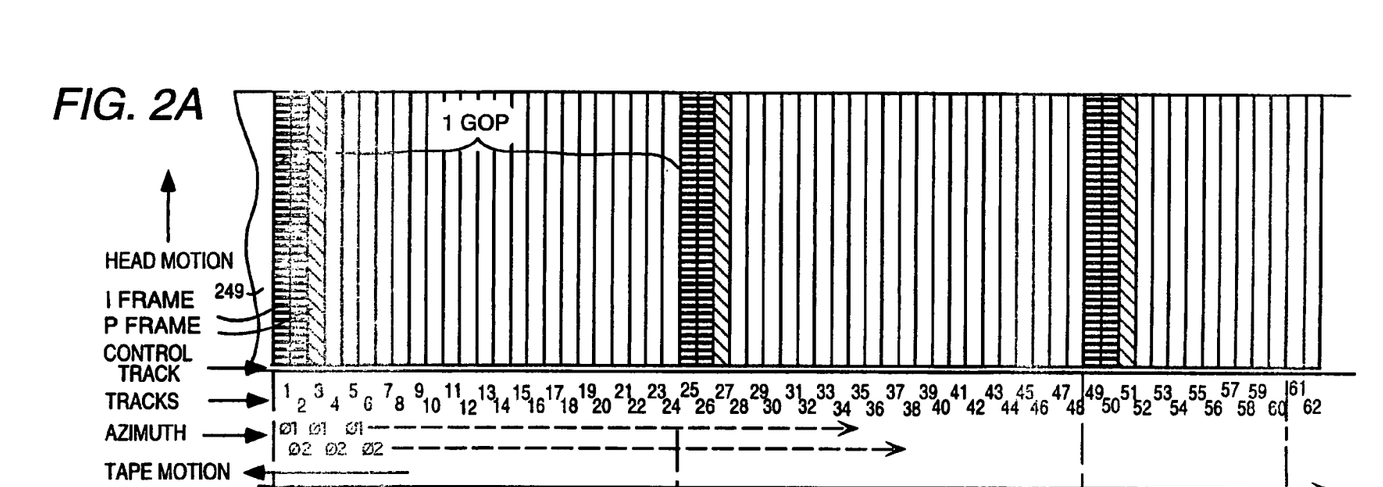
FIG. 2A shows tracks recorded on a medium employing inventive embodiments.
Figures 2B, 2C:
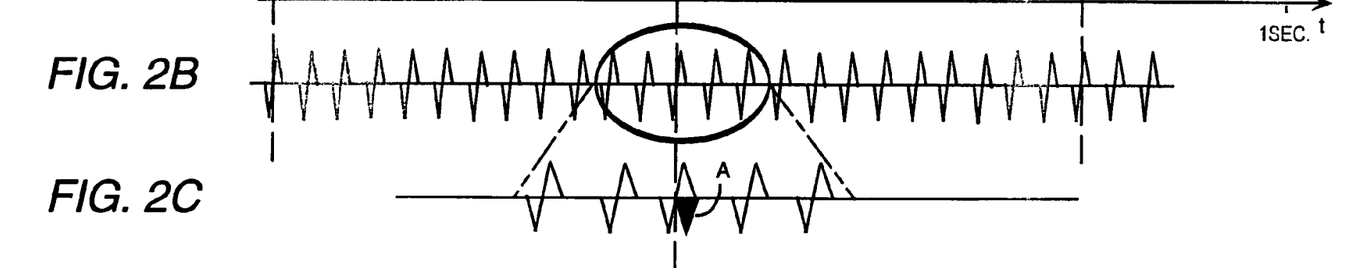
FIGS. 2B-2D depicts control track pulses, including various inventive embodiments, recorded on a medium.

In exemplary FIG. 2A, a magnetic tape 249 is shown recorded with an MPEG representative signal having a group of pictures size of 12 frames. Intra-coded data is shown with horizontal shading in FIG. 2A, and is depicted with recording initiated in track 1, with an azimuth phase angle Ø1 and continuing into track 2 with an azimuth angle Ø2. Forward predicted, or P frame data, is recorded in track 3 with an azimuth angle Ø1, and is shown shaded diagonally. The remaining 9 frames of this exemplary 12 frame GOP are written in the following unshaded track area. Since the recording head drum rotates at 1800 RPM and has two heads diametrically opposed, nominally 60 tracks are written per second. Thus the GOP size of 12 frames is illustrated occupying 24 tracks. However, since the amount of data present in each compressed frame varies in accordance with motion and scene complexity, the actual duration of individual frames may vary. Hence the duration of a GOP may vary and thus require that unfilled recording track capacity be filled with zeros. In the simple recorded track patterns of exemplary FIG. 2A. I frame data may or may not completely fill the data capacity provided by tracks 1 and 2, hence P frame data recording may be initiated in track 2 and continue in track 3. Similarly for the remaining frames of the group of pictures, which are written consecutively and may be distributed between adjacently recorded tracks. In addition, GOP size is user defined and may be changed at will with a new GOP being initiated with an I frame. Hence the advantageous coupling of I frame marker IF ensures that each I frame recording is always initiated with the same azimuth phase. For example, in FIG. 2A I frame tracks have an azimuth Ø1 and are indicated with a control track pulse, as shown in FIG. 2B. Control track pulses are, for example, derived from the head drum, have a repetition rate 30 hertz and mark one track of each pair, for example Ø1, for each head drum revolution.

In a further inventive embodiment, trick play reproduction may be advantageously facilitated by controlled reproduction of only tracks containing intra-coded or I frame data. Since I frame marker IF, determined the recorded track selection i.e. azimuth Ø1 or Ø2 and control track pulses mark alternate tracks, tracks containing I frame data may be advantageously identified for reproduction. To facilitate replay identification of I frame data, specific control track pulses are advantageously modulated during recording with signal A which is derived, as described previously, from the occurrence of I frame data in recording bit stream 211. Thus signal A modulates the control track signal to mark tracks containing I frames. FIG. 2C shows an enlarged section of the control track signal depicted in FIG. 2B. The section shown in exemplary FIG. 2C is centered, for example, about an I frame recorded in track 25, and illustrates a sequence of reproduced control track pulses. Pulse A, shown with a solid black section, marks I frame track 25 and has been advantageously pulse width modulated during recording to specifically indicate I frame data tracks.

Figure 3A:
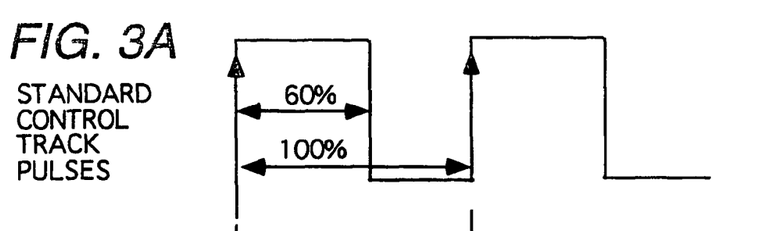
FIGS. 3A-3C show various control track pulse waveforms including pulse width modulation by supplementary information.

In the VHS format control track pulse width modulation is known and used to facilitate searching with systems such as Video Index Search Signal (VISS) or Address Search Signal or (VASS). However to summarize, control track pulse width modulation operates as follows. During repay the rising edges of the control track signal, depicted by arrow heads in FIG. 3A, are used for playback speed control. However the trailing, non-time critical edge of the control track pulse may be controllably phase shifted or repositioned. Data may be encoded by varying the phase or position of the trailing edge of the recorded control track signal between two distinct phases, or positions representing digital true and false or one and zero value data bits.

Figure 3B:
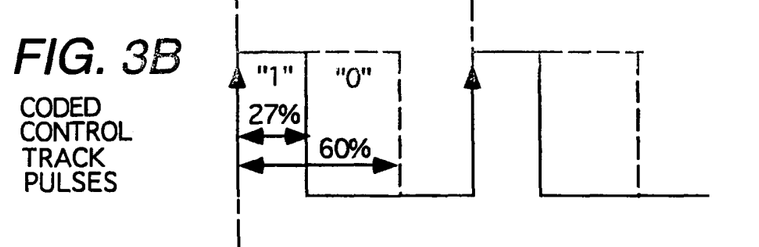
Figure 3C:
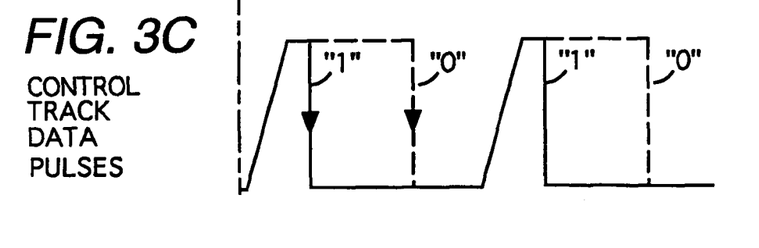

FIG. 3A depicts a standard control track pulse signal having a nominal pulse width duty cycle of between 50% to 60%. FIG. 3B depicts a phase modulated control track pulse showing both logical "1" and logical "0" values. A logical "1" is encoded, for example, by advancing the phase of the trailing edge, thus shortening the positive portion of the control pulse to a duration of about 27.5% of the pulse repetition period. A logical "0" value delays the trailing edge as compared to a nominal 50% duty cycle, for example to produce a pulse of 60% duration. FIG. 3C illustrates phase modulated control track pulses shaped for recording. Simple timing and gating circuits can distinguish between pulses having a duty cycle that is longer or shorter than a reference duration (e.g., 50%).

Figure 2D:
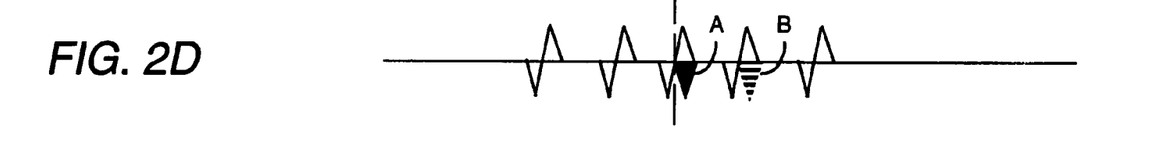

Additional control track identification may be advantageously provided to indicate tracks containing, for example, forward predicted frames, P frames or bi-directional encoded frames, B frames. Such additional data may indicate P and or B frames by additional pulse coding between 28% to 60% duty cycle of the control track pulse. Such P and or B frame indicators may, to simplify detection, follow and be enabled by, an occurrence of a preceding I frame coded control track pulse. For example FIG. 2D shows an enlarged section of the control track signal is centered about 1 frame track 25 as depicted in FIG. 2A. A sequence of reproduced control track pulses are illustrated in FIG. 2D with pulse A marking 25, and pulse B, shown with horizontal shading, advantageously width modulated to indicate P frame data tracks, for example track 27.

Figure 4A:
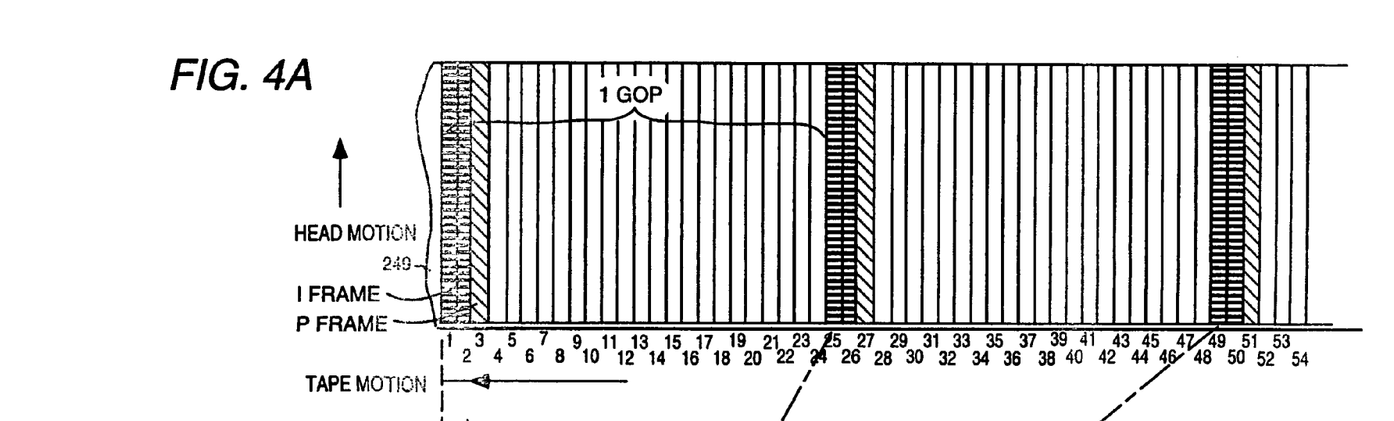
FIG. 4A shows the recorded pattern of FIG. 2A.
Figure 4B:
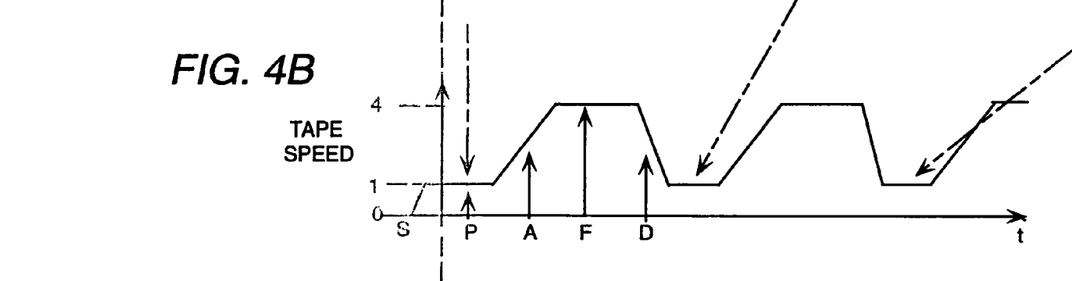
FIG. 4B shows an inventive tape speed control sequence facilitating trick play reproduction.
Figure 4C:
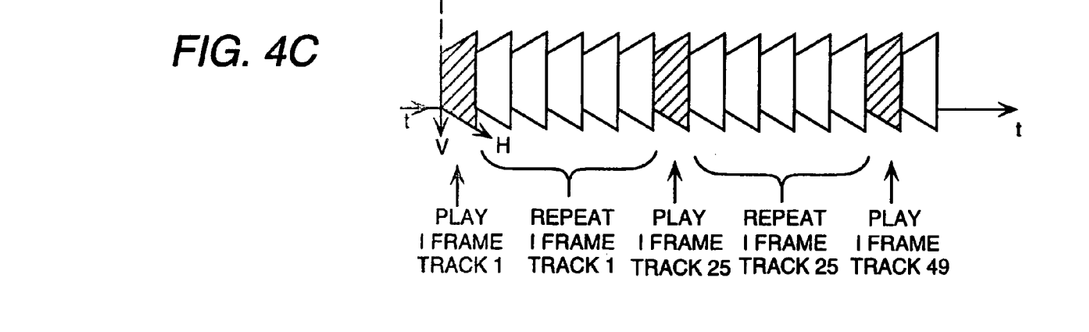
FIG. 4C depicts a trick play frame sequence resulting from the control sequence illustrated in FIG. 4B.

The advantageous use of control track pulse modulation enables recorded tracks to be identified during reproduction at play speed and speeds other than play speed. Thus specific tracks, for example, intra coded data or intra coded and forward predicted data, may be identified and reproduced. Tracks identified as non-decodable in trick play, and hence unwanted, may be passed with increased tape speed. By identifying recorded track content, an inventive method of trick play reproduction is facilitated where decodable data, for example, intra coded, or intra coded and forward predicted data may be replayed at normal speed, with unwanted data tracks being passed at an increased tape speed. The media and recorded signals of FIG. 2A are shown in FIG. 4A. FIG. 4B illustrates an exemplary automated trick play tape speed profile having areas of differing tape speed, S, P, A, F, and D occurring at various times. For example, area S corresponds to a stopped tape condition prior to reproduction. Area P represents normal play speed operation which is sustained for the duration of the intra coded data, which in this example is assumed to be contained in two recorded tracks, 1 and 2. Since the modulated A pulse marks the start of an I frame, the actual recorded duration is not marked, hence the play mode, indicated by area P, may be sustained for two or more control track counts. Following the control track count determining area P the tape is accelerated, during area A to be transported at a higher speed, for example four times. The exemplary automated trick play tape speed profile of FIG. 4B illustrates a fast play condition, area F, of duration nominally 5 tracks or approximately 2 CT pulse counts. Such a short duration may be difficult to implement due to the mechanical constraints of capstan inertia and tape and reel masses. However, the automated speed profile illustrated in FIG. 4B may be modified to accommodate specific recorder mechanisms. The automated trick play sequence illustrated in FIG. 4B may result in a sequence of decoded frames as depicted, horizontal, vertical and temporally in FIG. 4C. Clearly the number of repeated frames is determined by the availability of a newly reproduced decodable data stream. If only I frames of FIG. 4A were reproduced the program would be viewed at twelve times normal speed, assuming a 12 frame GOP. If a reproduced frame is held or repeated for approximately the duration of a GOP then there is no actual or perceived speed up in program delivery and the recorded moving images are effectively represented as a series of stills. Thus in example of FIG. 4A the program delivery rate is increased by slightly more than two times. The reproduced occurrence of I frame marker pulse A may be used to initiate a count of succeeding non-modulated control track pulses to determine or predict the occurrence of the next automated play sequence. Fast play duration in excess of one GOP may be facilitated by counting A pulses then decelerating to assume a normal play speed prior to the occurrence of the next I frame.

As previously described, the control track signal may be modulated to yield pulse A, which may advantageously be further utilized by recorder control logic 205 to inventively determine an average length of reproduced groups of pictures. For example, during a normal play back condition control logic 205 may receive signals from control track processor 208 indicative of reproduced I frames. These I frame markers may be used to adaptively measure the length or duration of reproduced groups of pictures or GOPs by counting the number of control track pulses occurring between I frame markers. The replay GOP lengths may be averaged and processed, for example, by subtraction to provide anticipation of the next I frame and to account for media deceleration as indicated by area D of FIG. 4B.

Figure 5:
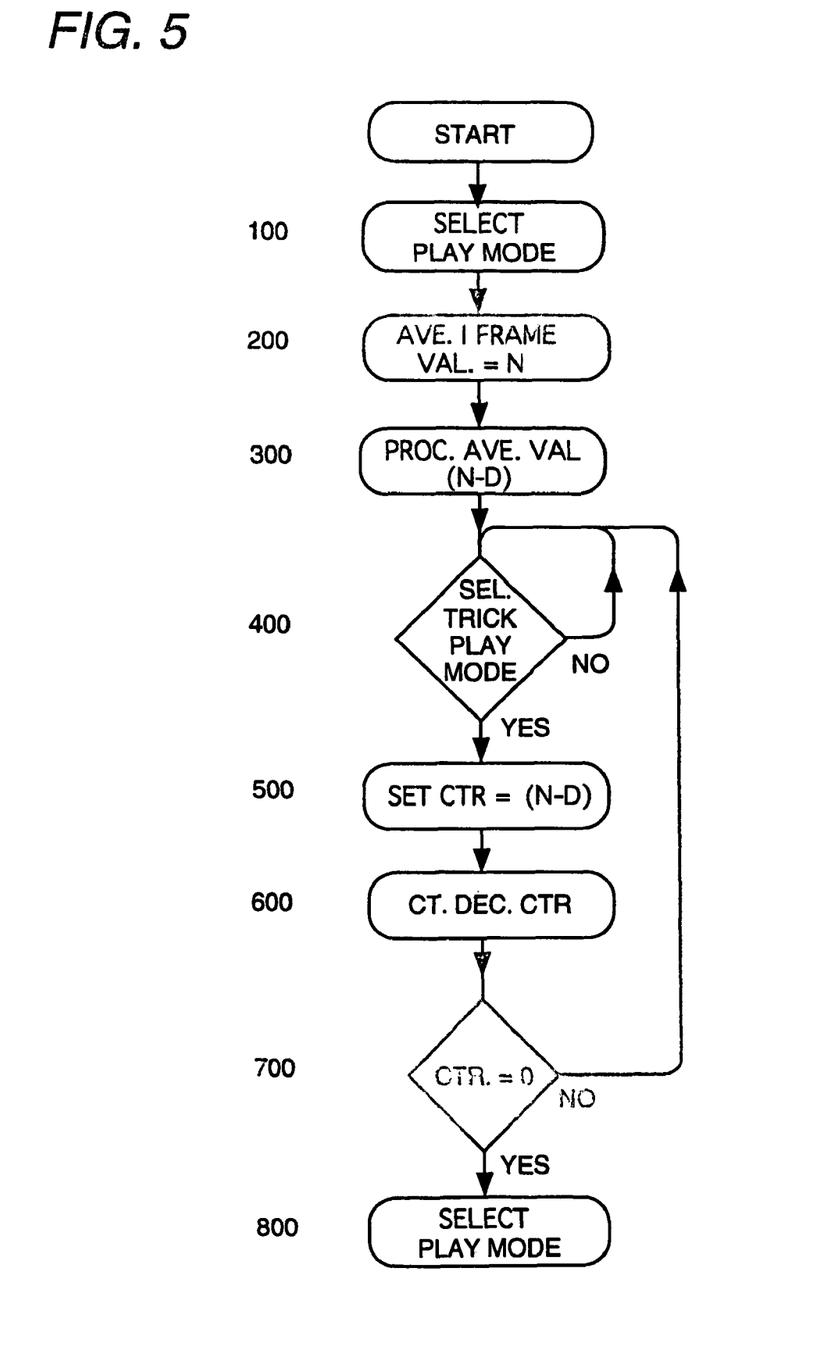
FIG. 5 is an exemplary flow chart illustrating an inventive trick play method for anticipating a track containing an I frame.

FIG. 5 is an exemplary flow chart which illustrates an inventive method for dynamically and adaptively anticipating a replay occurrence of a track containing an I frame. In FIG. 5 a play mode is selected at step 100 and as described the recorded signal is reproduced however decoding may not occur until an I frame is reproduced. At step 200 the replay I frame or alternatively the control track I frame marker pulse A is measured to determine an average interval between I frames or marker pulses. This average interval value represents the duration of each group of pictures (GOP) and is averaged to reduce or remove effects of shortened or variable GOPs. At step 200, I frames or marker pulses enable or gate the summation or count of reproduced control track pulses thus provided a direct linear measurement of the duration of each GOP. The control track pulse count is averaged and a value N determined. Thus, since control track pulses are recovered during fast play or shuttle modes the next track containing an I frame may be located and accessed by counting CT pulses. However, since the replay apparatus and recording medium exhibit inertia the average value N is processed at step 300, for example by subtraction of a deceleration value D to yield a lesser CT pulse count value which anticipates the occurrence of the next I frame track and allows for capstan servo deceleration and track acquisition. Different deceleration values are employed in relationship with the fast play or shuttle speed. Thus at step 300 the replay apparatus is in a play mode and determining an average CT pulse count value to the next I frame. At step 400 a test is performed to determine the selection of a trick play mode. A NO at step 400 forms a loop which waits until trick play is selected which results in a YES. The YES at step 400 sets, enables or loads a counter at step 500 with the value (N−D). The counter is decremented at step 600 with reproduced control track pulses and tested at step 700 for a zero value. The trick play mode is maintained for non-zero counts by a NO at step 700 which loops back to step 400. However when step 700 tests YES the next track containing a recorded I frame is anticipated and a play mode is initiated at step 800. Steps 400 to 800 are repeated by the occurrence of the reproduced I frame or control track marker pulse A which sets or loads the counter at step 500. The trick play mode is terminated when step 400 tests NO, for example, responsive to user command.

The method depicted in exemplary flow chart of FIG. 5 employs control track pulses which marked during recording to indicate the recorded occurrence of an I frame. However in another inventive embodiment the exemplary method of FIG. 5 may be utilized with recordings without control track I frame marker pulses. Tapes without control track marker pulse A may be played following the steps depicted. However, determination of average GOP size, step 200, in terms of control track pulse count is facilitated by means of I frame markers or pulses, for example signal IFR derived from the derived from the decoded reproduced MPEG data stream by, for example IRD 100. The replay I frame signal IFR is coupled, as has been described, to controller 205 and is processed to establish an average value of GOP size. When trick play operation is selected an automated trick play control sequence is read from memory with the control sequence initiated by the occurrence of I frame signal IFR which sets the counter at step 500. The period between normal speed reproduction being determined by the processed average GOP value as described earlier. Thus recordings without I frame encoded control tracks may be replayed in a trick play operating mode.

The invention claimed is:

1. A recording and replay apparatus with trick play reproduction mode comprising the steps of:
   a) initiating a play mode;
   b) determining an average number of control track pulses occurring between I frames;
   c) selecting a trick play mode;
   d) counting control track pulses to determine an average value;
   e) testing a count for equality with said average number; and,
   f) initiating said play mode at count equality.

2. The recording and replay apparatus of claim 1, where said step b) additionally comprises:
   controlling average determination responsive to a reproduced I frame mark.

3. The recording and replay apparatus of claim 1, wherein said step b) additionally comprises:
   controlling determination of average responsive to an I frame indicator decoded from reproduced data.

4. The recording and replay apparatus of claim 1, wherein said step d) additionally comprises:
   controlling counting responsive to a reproduced I frame mark.

* * * * *